Oct. 23, 1962 D. KLEIST 3,059,454
APPARATUS FOR CENTRIFUGING FIBERS
Filed Sept. 19, 1960 2 Sheets-Sheet 1
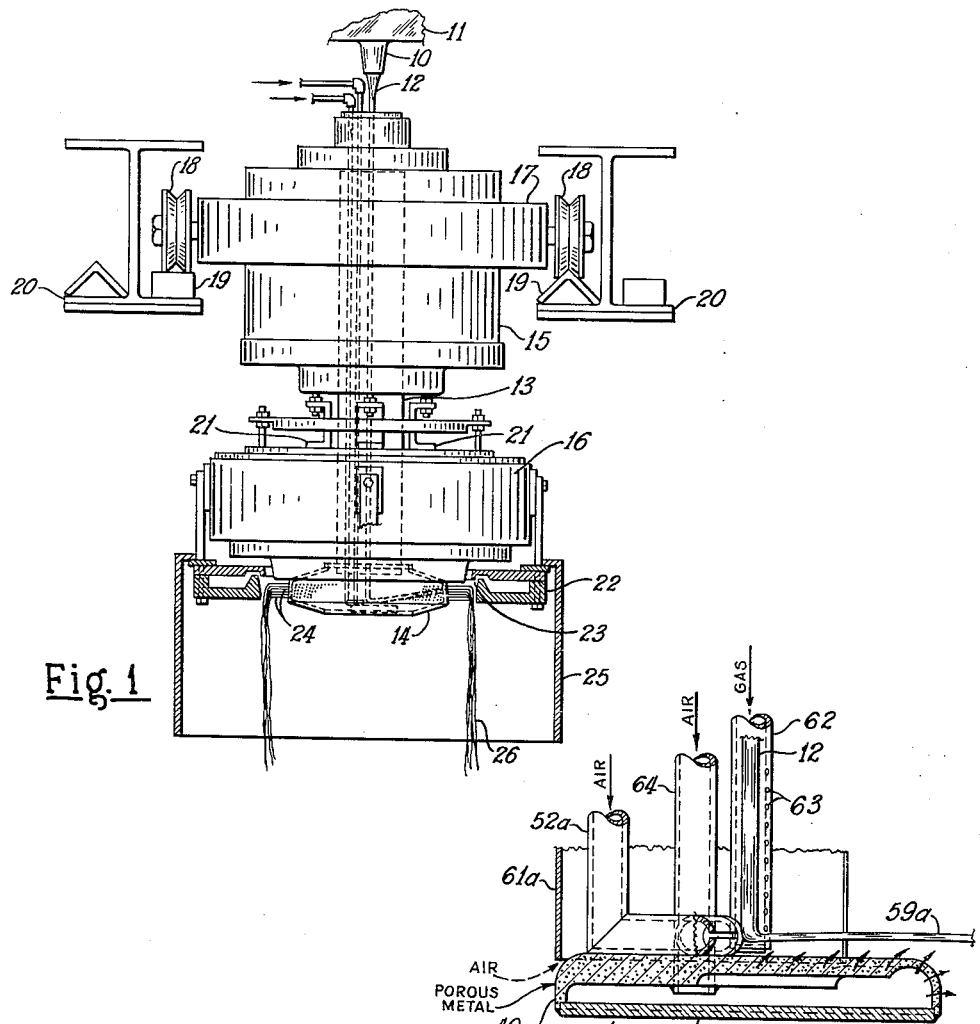
Fig. 1
Fig. 6
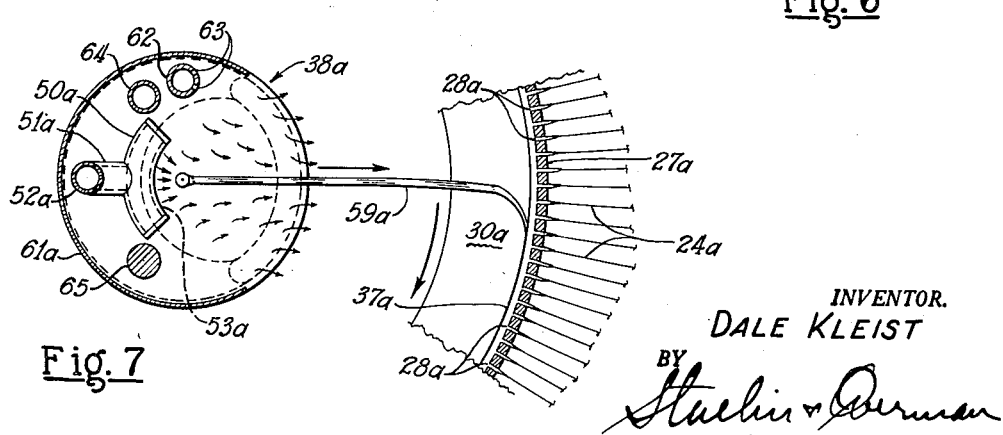
Fig. 7
INVENTOR.
DALE KLEIST
BY
ATTORNEYS Oct. 23, 1962 — D. KLEIST — 3,059,454
APPARATUS FOR CENTRIFUGING FIBERS
Filed Sept. 19, 1960 — 2 Sheets-Sheet 2
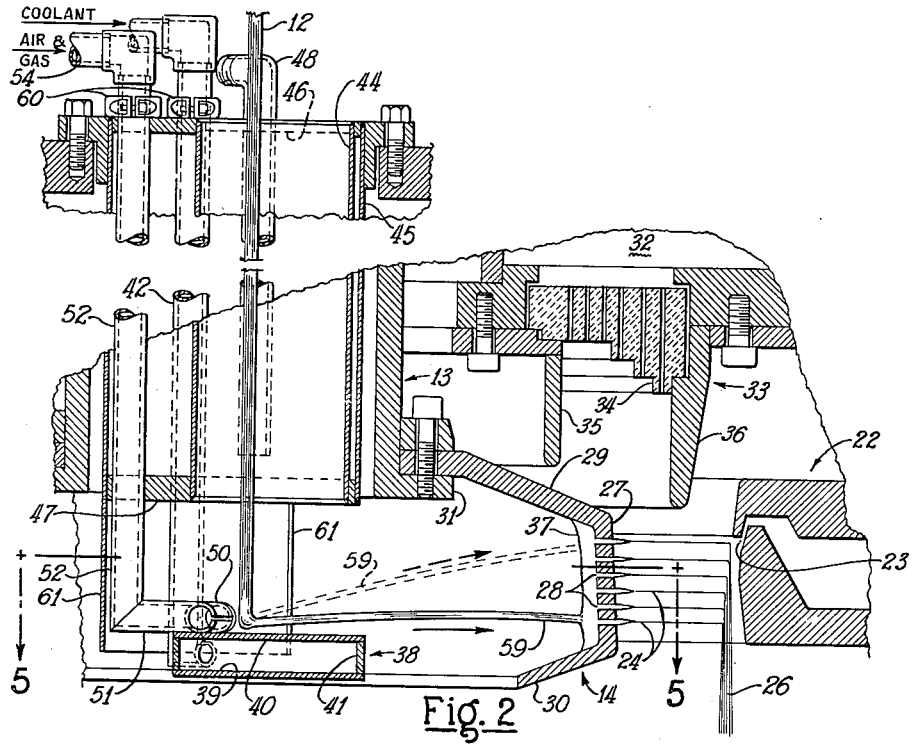
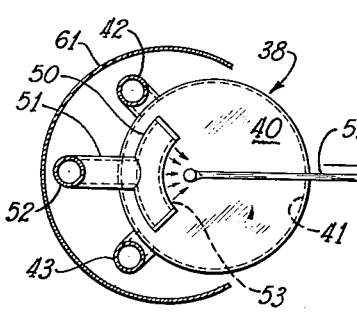
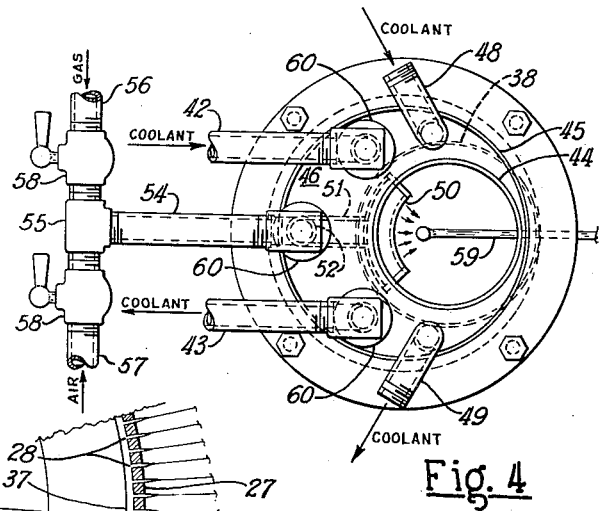
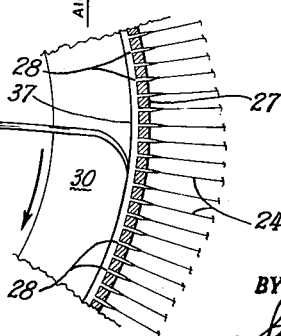
INVENTOR.
DALE KLEIST
BY
ATTORNEYS

United States Patent Office 3,059,454
Patented Oct. 23, 1962

3,059,454
APPARATUS FOR CENTRIFUGING FIBERS
Dale Kleist, St. Louisville, Ohio, assignor to Owens-Corning Fiberglas Corporation, a corporation of Delaware
Filed Sept. 19, 1960, Ser. No. 56,857
7 Claims. (Cl. 65—148)

This application is a continuation-in-part application of my co-pending application Serial No. 854,444, filed November 20, 1959, now abandoned.

This invention relates to an apparatus for centrifuging fibers of the type employing a generally cylindrical centrifuge with a hollow interior and a peripheral wall through which there are formed a plurality of stream forming orifices, and more particularly to apparatus for distributing the liquid fiberizable material uniformly over the inner surface of the perforated wall in order to maintain an annular body of the material against the wall from which body material is flowed through the orifices and projected from the centrifuge in the form of fiberizable streams of material.

While distribution means embodying the invention may be employed in connection with the centrifuging of fibers of many different kinds of material, for purposes of illustration in this specification the apparatus will be described in connection with its use for the formation of fine glass fibers from molten glass wherein streams of glass are projected centrifugally into an annular blast of high-velocity gases and the streams are attenuated by the kinetic energy of the blast of gases into very fine fibers which are then collected in the form, for example, of glass wool mats.

Apparatuses for forming fine glass fibers by centrifuging are well known. In many of them, a supply stream of molten glass is flowed into the interior of a hollow cylindrical centrifuge. It is also known that in order for such an apparatus to operate successfully at high output, the centrifuge must have a very high number of holes, say as many as 3600, or more, drilled through its periphery so that a very large number of streams may be projected thereby into the annular gaseous blast by which the streams are attenuated into fine fibers. In order to provide such a large number of orifices, they are usually arranged in as many as six or eight vertically spaced, circumferential rows. It is necessary that the distribution of the molten glass be relatively uniform over the entire inner face of the centrifuge forming an annular body of glass thereon from which the glass is flowed through the orifices in the centrifuge. The annular body of glass must be of adequate volume to prevent any of the holes from "running dry" and must be relatively uniform so that centrifugal force acts on a substantially uniform mass extending around the entire periphery of the centrifuge, in order that substantially uniform forces will be applied to each of the streams being projected through the orifice in the centrifuge.

Various distributors have been suggested which are mounted on and actually rotated with the centrifuge, the glass supply stream impinging upon the upper surface of the distributor and being splattered or thrown outwardly to the wall of the centrifuge by centrifugal force.

The use of a distributor which is fixed to and rotated with the centrifuge itself, is often not satisfactory because it is very difficult to achieve even distribution, and because the distributing means can function only to the extent that the peripheral force created by rotating the centrifuge can be utilized. Because the speed of rotation of the centrifuge is selected to control the force with which streams are thrown outwardly from the centrifuge, its speed cannot be determined solely by the requirements for distributing the glass over its inner face.

In addition, where the distribution of the glass over the inner face of the centrifuge in order to build up and maintain the annular body depends upon centrifugal force which is proportional to the speed of rotation of the centrifuge itself, it is impossible to modify the distribution forces to compensate for changes in temperature, and viscosity of the glass and to provide for different rates of distribution to permit different "pull rates," i.e., different rates of production of fine glass fibers in pounds per hour, for example.

The presence of a rotary distributor within and attached to or mounted on the hollow centrifuge presents another difficulty. In any such centrifuging system, the incoming glass is at a high temperature and is the source of a substantial quantity of the total heat brought into the system. When starting up such an apparatus, of course, the centrifuge is cold. If the hot glass is brought into a cold centrifuge, it freezes in the small orifices of the centrifuge and cannot be removed except by mechanical or chemical methods. It is necessary, therefore, to bring the centrifuge wall up to operating temperature before introducing the glass. In such systems, it is customary to provide an internal, start-up heater with which to preheat the centrifuge. A mechanical distributor capable of effective distribution and located at the center of the centrifuge occupies the space in which an internal heater should be located in order to effectively heat the inner face of the centrifuge wall, and there is, therefore, inadequate room for such a heater.

It is an object of the instant invention to provide apparatus for distributing glass over the inner face of a hollow centrifuge wherein the forces utilized to cause the distribution of glass are completely independent of the speed of rotation of the centrifuge itself and of the centrifugal force and thus the apparatus operates to properly distribute glass without regard to variations in its temperature and viscosity.

It is another object of the instant invention to provide an apparatus for the distribution of glass over the inner face of a hollow centrifuge wherein the natural characteristics of an expanding blast of gas are utilized to produce uniform vertical distribution of the glass over the inner face of the centrifuge.

It is another object of this invention to provide a gaseous glass distributing jet positioned near the center of a hollow centrifuge for deflecting a supply stream of glass or other fiberizable material over the inner face of the centrifuge periphery, such jet being capable of applying force to the stream for lateral deflection completely independently of the speed of rotation of the centrifuge.

It is still another object of the invention to provide a gaseous jet positioned at about the center of a hollow centrifuge which has a generally cylindrical wall with a multiplicity of stream forming orifices therein, such jet functioning to supply a combustible mixture of gases for burning in the interior of the centrifuge for pre-heating the same or a jet of burning gases or air or other gas, for deflecting and distributing a supply stream of glass over the inner face of the centrifuge and/or supplying additional heat thereto during operation.

It is a still further object of the instant invention to provide apparatus for the distribution of a liquid fiberizable material over the inner annular face of a hollow centrifuge by the use of an expanding blast of gaseous medium which prevents the liquid material from contacting structural elements of the apparatus and which achieves uniform distribution thereof on the inner surface of the peripheral portions of the centrifuge.

It is yet another object of the instant invention to provide an air jet actuated distributing means utilizing a film of air flowing through and over a metallic surface for the purpose of cushioning a heavy supply stream of glass and preventing it from coming into contact with structural elements of the air jet apparatus.

And yet another object of the instant invention is to provide an air jet apparatus designed for cushioning the fall of a supply stream of hot molten glass, deflecting such supply stream horizontally and distributing the stream over the inner surface of a hollow rotating centrifuge wherein the structural elements of the air jet apparatus are cooled and protected by a flow of fluid, the coolant or protective fluid in one case being retained internally of the apparatus and in the second case being bled out through porous walls of parts of the apparatus.

The foregoing and other more specific objects and advantages will be better understood from the specification which follows and from the drawings, in which:

FIG. 1 is a fragmentary, small scale view, partly in section and partly in elevation, of an apparatus for forming fine glass fibers of the type with which the apparatus embodying the invention is designed to be employed.

FIG. 2 is a fragmentary sectional view on an enlarged scale showing parts of the glass fiber forming apparatus and illustrating an air jet apparatus embodying one modification of the invention.

FIG. 3 is a fragmentary detailed view in perspective of a means for forming a stream distributing blast according to a first modification of the invention.

FIG. 4 is a fragmentary partial plan view taken generally from the position indicated by the line 4—4 of FIG. 2.

FIG. 5 is fragmentary, horizontal, sectional view taken along the line 5—5 of FIG. 2.

FIG. 6 is a fragmentary, vertical, sectional view on a still further enlarged scale, showing a second embodiment of the invention with a modified form of air jet apparatus.

FIG. 7 is a view similar to FIG. 5 but of the apparatus shown in FIG. 6.

Apparatus embodying the invention is illustrated in use in a major apparatus for forming fine glass fibers by the use of centrifugal force and a gaseous blast having high kinetic energy. Such a major apparatus is illustrated in FIG. 1 as being positioned beneath a spout 10 on the bottom of a glass melting unit 11 which may be a forehearth of a large glass tank or an individual melter designed particularly for use with the fiberizing apparatus. A supply stream 12 pours downwardly out of the spout 10 through the hollow interior of a rotary quill, generally indicated at 13, and into the interior of a generally cylindrical, hollow centrifuge 14. The quill 13 is mounted for rotation on the normal axis of the centrifuge 14 by suitable bearings and support means contained within a drive housing 15 and a burner housing 16. The drive housing 15 also carries a motor (not shown) by which the quill 13 is rotated. The drive housing 15 may be supported, for example, by a yoke 17 on wheels 18 which travel along parallel tracks 19 that are in turn mounted upon supporting beams 20 in order to move the apparatus into and out of position beneath the spout 10.

The burner housing 16 is supported from the bottom side of the drive housing 15 by suitable hangers 21 and, in turn, supports an annular blower 22. The blower 22 is positioned circumjacently the periphery of the centrifuge 14 and has a downwardly directed, continuous or interrupted annular orifice 23 from which there is emitted an expanding gaseous blast, for example, steam, combustion products, heated air, etc., the kinetic energy of which is used for attenuating glass streams 24 which are projected into the blast from the periphery of the centrifuge 14. An annular protective guard 25 depends from the burner housing 16 around the area of the centrifuge 14 and blower 22. The force of the blast of gases emitted from the orifice 23 attenuates the streams 24 to form a downwardly descending veil of fine fibers, generally indicated at 26, which is driven downwardly by the expanding blast of gases from the orifice 23 onto a collecting conveyor (not shown). The conveyor may pass over an exhaust hood to withdraw the gases of the blast from the apparatus and leads outwardly from beneath the fiber forming apparatus in order to carry away the blanket of fibers collected on the conveyor.

Referring now to FIG. 2, the centrifuge 14 has a generally cylindrical peripheral wall 27 through which there are drilled or otherwise formed a plurality of circumferentially extending rows of orifices 28. The peripheral wall 27 is joined at its upper circular edge to an inwardly and upwardly extending, frusto-conical wall 29 and at its lower circular edge to an inwardly directed frusto-conical, bottom lip 30. At the inner edge of the upper wall 29, the centrifuge 14, as a whole, is mounted on a horizontal flange 31 of the hollow rotary quill 13.

In the general apparatus illustrated in the drawings, the burner housing 16 includes a mixing chamber 32 which provides a supply of combustible gases for an annular burner 33 mounted slightly above and approximately in line with the peripheral wall 27 of the centrifuge 14. The burner 33 is shown as having a stepped orifice ring 34 which may be fabricated from ceramic or metal and a pair of flame guides 35 and 36. Combustible gases mixed in the chamber 32 are burned in the space between the flame guides 35 and 36 so that the flames from the combustion of the gases play downwardly and across the outer cylindrical face of the peripheral wall 27 of the centrifuge 14 and into the annular space between the centrifuge 14 and the inner side of the blower 22. The gaseous blast from the blower orifice 23 is directed downwardly to impinge upon the streams 24 projected outwardly through the stream forming orifices 28 of the centrifuge 14 by centrifugal force and the streams 24 are, as mentioned, attenuated downwardly into fine fibers by the force of the blast of gases emitted from the blower 22.

In order to provide a supply from which centrifugal force can flow the molten fiber forming material, in this case glass, through the stream forming orifices 28 of the centrifuge 14, an annular body 37 of the fiber forming material must be accumulated and maintained against the inner surface of the peripheral wall 31. The supply stream 12 flows downwardly, generally along the axis of rotation of the quill 13 and the centrifuge 14 through the hollow center of the rotary quill 13, and into the interior of the hollow centrifuge 14.

In the embodiment of the invention illustrated in FIGS. 2–5, a generally horizontal distributor plate 38 is positioned within the interior of the centrifuge 14 and extends across the path of the stream 12. The deflector 38 is hollow, being fabricated from a lower disc 39 and an upper disc 40 which are connected to each other to form a hollow body by a cylindrical wall 41. The distributor plate 38 is suspended in the interior of the centrifuge 14 by a pair of vertically extending coolant pipes 42 and 43, the pipe 42 functioning to lead coolant to the interior of the plate 38 and the pipe 43 serving to carry the coolant away from the plate 38. Each of the pipes 42 and 43 includes suitable elbows and fittings by which it is connected to a pump and heat transfer means for the coolant. The coolant may be simply water or it may be another liquid or solution which is chilled in order to maintain the deflector 38, and particularly its upper disc 40, at a temperature level substantially below that of the environment within the centrifuge 14.

The quill 13 is hollow and is mounted in external bearings (not shown) for rotation around a stationary jacketed passageway for the supply stream 12. The jacket for the glass passageway is formed by a pair of eccentric tubes 44 of smaller diameter and tube 45 of larger diameter. The tubes 44 and 45 are parallel to each other and of the same length and the space therebetween is closed by end walls 46 at the top and 47 at the bottom. The end walls 46 and 47 are generally crescent shaped (FIG. 4) but the space between the two tubes 44 and 45 is continuous around the exterior of the tube 44. The coolant pipes 42 and 43 (FIG. 4) extend through the space between the inner tube 44 and outer tube 45 and through suitable openings in the top wall 46 and bottom wall 47. The space between the inner tube 44 and the outer tube 45 as defined by their end walls 46 and 47 is also cooled in order to control the environment through which the supply stream 12 of glass is fed to the interior of the centrifuge 14. An inflow coolant tube 48 (see FIGS. 2 and 4) extends downwardly through the upper wall 46 and the space between the inner tube 44 and outer tube 45 almost to the bottom of that space (see FIG. 2). An outflow coolant tube 49 also extends through the upper wall 46 but only into the upper portion of the space between the inner tube 44 and outer tube 45. Coolant flows from a source through the tube 48 to the bottom of the space between the tubes 44 and 45 and then upwardly and out through the outflow coolant tube 49.

Glass flowing downwardly through the cooled passageway formed by the inner tube 44 and outer tube 45 is distributed outwardly against the inner surface of the peripheral wall 27 of the centrifuge 14 by a blast of gas from jet means which are located adjacent the path of the stream 12 and above the upper surface of the deflector 38. This jet means comprises an arcuate tube 50 which may rest upon the upper surface of the deflector 38 (FIG. 3) and which is connected by a short nipple 51 to a gas supply pipe 52. The supply pipe 52 extends downwardly through the space between the tubes 44 and 45 and through both the upper and lower walls 46 and 47. The arcuate tube 50 has a slot 53 cut at about the median horizontal plane in the inner side of its arc. The gas supply pipe 52 is connected at its upper end by a nipple 54 to a T 55 and to two source pipes 56 and 57 for combustible gas and air, respectively. Each of the source pipes 56 and 57 has a valve 58.

During start-up, both gas and air may be fed in suitable mixture to the pipe 52 and the mixture flowing from the arcuate slot 53 in the tube 50 may be ignited to burn as a heater for pre-heating the inner face of the wall 27 of the centrifuge 14 and to aid the outer burner 33 to quickly bring the material in the wall 27 to operating temperature. When the centrifuge 14 reaches operating temperature, and the glass supply stream 12 is allowed to flow into the centrifuge 14, the flame jet emanating from the arcuate slot 53 deflects the stream to distribute the glass onto the inner face of the wall 27. In conditions requiring continued addition of heat to the system, the mixture of gas and air may be continued in the pipe 52. On the other hand, if the system is already at heat, or if the glass in the stream 12 brings enough heat into the system so that the internal heat is not required, the operator may turn off the gas and feed only air into the pipe 52 which acts to deflect the glass stream 12 for distributing it over the inner surface of the peripheral wall 27 of the centrifuge 14.

As appears more clearly in FIG. 2, the expansion of the blast of air or other gases from the slot 53 results in there being a constant flame or gas of high energy spreading across the top of the upper disc 40 and intervening between the hot glass in the stream 12 and the surface of the disc 40. The film of high velocity gas moving across the upper surface of the disc 40 thus prevents the glass from impinging upon the disc 40 where it might collect and gradually build up an obstructing mass. Because of the expanding characteristics of the jet of gas flowing across the top of the deflector 38 at high velocity, the stream of glass 12 is deflected horizontally as a plume and flutters in the blast of gases much in the same manner as a flag or pennant would flutter in the wind. Expansion of the blast of gases from the slot 53 causes the gases to impinge against the upper surface of the deflector 38 and, due to the fluttering reaction, the stream 12 is bent horizontally and outwardly directed to form a distribution stream 59 which is "played" vertically over the inner surface of the generally cylindrical peripheral wall 27, moving between the lower position indicated in FIG. 2 in solid lines and the upper position indicated therein in broken lines. This fluttering action results in a randomly uniform distribution of the glass in the distribution stream 59 over the vertical extent of the peripheral wall 27.

Because the centrifuge 14 is rotated at high speed, the outermost portion of the distribution stream 59 (see FIG. 5) blends into the body of glass 37 and remains connected to that body of glass 37 so that rotation of the centrifuge 14 in the direction of the arrow in FIG. 5 bends the distribution stream 59 slightly in a horizontal plane as it flows outwardly to replace glass projected from the centrifuge 14 due to its rotation.

By releasing the jet of gases from the arcuate slot 55 which is generally focused on the line of movement of the stream 12, the stream 12 is "held" in the high velocity portion of the jet of gases and does not drift laterally or escape therefrom.

The pressure of the gaseous blast fed into the apparatus by the supply tube 52 and delivered out of the slot 53 is not critical. It has been found, for example that a pressure not over, say 30 lbs. per square inch of air at the slot 53, is fully adequate to distribute a substantial stream of glass 12 over the inner surface of a centrifuge some eight inches or more in diameter and rotating, perhaps, at a speed of 3500 r.p.m. The independence of the apparatus embodying this modification of the invention by which the supply stream of glass 12 is deflected and converted into a distribution stream 59 and is distributed over the inner surface of the centrifuge results in it being possible to rotate the centrifuge at a speed appropriate to produce primary streams 24 for attenuation into the fine fibers 26, completely independently of the force, speed or other characteristics of the distribution of the glass over the interior wall of the centrifuge 14. It is thus possible through the apparatus embodying the invention to provide for independent control and maintenance of the annular body 37 of glass in which the centrifugal expelling force is generated to supply and maintain a proper quantity of glass for the body 37. This body 37 not only must supply the glass from which the streams 24 are projected but it also must be kept quite uniform in order to keep the forces acting upon the centrifuge 14 balanced and to prevent any of the stream forming orifices 28 from running dry.

The deflector 38 is suspended in place by its two coolant flow pipes 42 and 43 and the arcuate jet tube 50 rests on the deflector 38 being connected to the air and gas sources by the pipe 52. Each of the three pipes 42, 43 and 52 is held in vertical position by a split collar 60 and the collars 60 lie on the top end wall 46. The vertical position of the deflector 38 and the jet from the slot 53 may be adjusted relative to the wall 27 of the centrifuge 14 by loosening the collars 60, moving the pipes 42, 43 and 52 vertically and re-tightening the collar 60 in order to vary the distributing pattern of the glass over the inner face of the centrifuge wall 31 and also to accommodate centrifuges having more or less rows of stream forming orifices 28 in their peripheries.

A semicircular shield 61 extends downwardly, partially surrounding the deflector 38 and generally enclosing the lower portion of the supply stream 12, below the lower end of the quill 13 and within the interior of the centrifuge 14. The shield 61 aids in controlling the action of the supply stream 12 and distribution stream 59 by shielding the stream 12 from ambient air currents so that its reactions can be determined and controlled solely by the position of, and the force generated by, apparatus embodying this modification of the invention.

In the embodiment of the invention illustrated in FIGS. 6 and 7, the air jet distribution apparatus comprises parts similar to those described above but including several modifications which will now be described. The supply stream of glass 12 is flowed downwardly in the manner as described above into the interior of the centriguge 14 and across an air jet delivered from an arcuate slot 53a of an arcuate tube 50a similar to the slot 53 and tube 50 described above and which are similarly connected by a nipple 51a and supply pipe 52a to a source of gas. In this embodiment of the invention the gas source tube 52a need be connected only to an air line since combustible material for internal heat is supplied in this embodiment of the invention by a gas supply line 62 through the lower portion of the wall of which there are drilled or otherwise formed one or two rows of orifices 63. Gas fed through the pipe 62 may be burned in the area of glass stream deflection for the purpose of providing heat to this area either during initial start-up or during operation, as conditions require.

A deflector 38a similar in general configuration to the deflector 38 described above is supported in position across the downflow path of the glass stream 12 by an air supply line 64 which leads into the hollow interior of the deflector 38a. A positioning stud 65 is welded or otherwise secured to the upper surface of the deflector 38a in the position of the coolant pipe 43 of FIG. 5 and in inserted into the opening formed in the bottom end wall 47 in the place of the coolant return pipe 43 for positioning the deflector 38a within the centrifuge 14. As in the case of the embodiment of the invention illustrated in FIGS. 1–5, this second embodiment of the invention utilizes the jet of air emanating from the slot 53a to turn the glass supply stream 12 horizontally and propel it radially outwardly to impinge against the inner side of the peripheral wall 27a of the centrifuge 14 and to build up an internal annular body 37a of glass thereon which is projected by centrifugal force through orifices 28a in the wall 27a in the form of streams 24a.

The deflector 38a of FIGS. 6 and 7 differs from the deflector 38 in its particular construction. The deflector 38a comprises a lower metal disc 39a and a porous metal upper disc 40a. The upper disc 40a is formed from a powdered or granular metal in such a manner and by such a technique that its entire body is porous, so that air fed into the hollow interior of the deflector 38a from the air supply tube 64 flows outwardly through the upper disc 40 in very minute individual jets forming a cushion or film of air over the entire upper surface of the upper disc 40a. This film of air thus formed is of such nature that to the touch of an observer it gives the impression that the upper surface of the porous metal disc 40a is "greased." The pressure of this film of air flowing over the surface of the disc 40a is, however, high enough so that it is not penetrated by the falling supply stream 12 of glass and serves to "lubricate" or "cushion" that supply stream 12 and also the horizontally returned distribution stream 59a.

As in the case of the earlier described embodiment of the invention, the area above the deflector 38a is protected from ambient air disturbance by a shield 61a. It will be observed that the shield 61a does not meet the surface of the upper disc 40a which leaves an annular slot through which ambient air may be introduced into the area in order to provide for the combustion of the gas fed out of the orifices 63 in the bottom of the gas supply line 62 and also to supply the eductor effect of the jet of air delivered from the slot 53a.

I claim:

1. In an apparatus for centrifuging fibers from liquid fiberizable material, said apparatus having a hollow centrifuge with a substantially cylindrical perforated, peripheral wall and a hollow rotary quill for mounting said centrifuge for rotation on a vertical axis that is normal for such cylindrical wall, said quill having an open vertical passageway therethrough leading into the interior of said centrifuge for the passage therethrough of a stream of liquid fiberizable material, the improvement comprising, in combination, a horizontal deflector positioned within the interior of said centrifuge below and across the path of said stream, jet means having a horizontally extending, arcuate orifice positioned just above and lying generally parallel with the upper surface of said deflector for directing a converging blast of gas across the upper surface of said deflector and the path of said stream, and a gas line extending downwardly through said quill and connected to said jet means.

2. Apparatus according to claim 1 in which said deflector is hollow and coolant tubes extending downwardly through said quill and communicating with the interior of said deflector for delivering coolant thereto.

3. Apparatus according to claim 1 in which the passageway through said quill is formed by a tube having double vertical walls and end walls closing the space between said vertical walls, and coolant tubes connected to said space for circulating coolant between said walls.

4. Apparatus according to claim 1 and independently controllable, separate fuel gas and air sources connected to the gas line for feeding fuel gas and air to the jet means.

5. Apparatus according to claim 1 and means for adjustably positioning the jet means vertically relative to the inner wall of the centrifuge.

6. Apparatus according to claim 2 in which the deflector is a cylindrical body and the upper horizontal end of said deflector is formed of porous metal and means for feeding gaseous coolant to the interior of said deflector whereby the gaseous coolant flows outwardly through said porous metal and supplies a thin gaseous film over the surface thereof for cushioning said supply stream.

7. Apparatus according to claim 2 in which the upper end of said deflector is formed of imperforate metal.

References Cited in the file of this patent

UNITED STATES PATENTS

| 2,478,090 | Devol | Aug. 2, 1949 |
| 2,624,912 | Heymes et al. | Jan. 13, 1953 |
| 3,014,235 | Snow | Dec. 26, 1961 |
| 3,014,236 | Snow | Dec. 26, 1961 |

FOREIGN PATENTS

| 1,154,476 | France | Apr. 10, 1958 |